(12) United States Patent
Harbaugh et al.

(10) Patent No.: US 9,023,176 B2
(45) Date of Patent: May 5, 2015

(54) MODULAR HEAD AUTOMATED FABRIC LAMINATING APPARATUS

(75) Inventors: C. Timothy Harbaugh, Derby, KS (US); Patrick William Daley, Wichita, KS (US); Teddy Lee Kellums, Valley Center, KS (US); W. Robert Nelson, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 119 days.

(21) Appl. No.: 13/445,498

(22) Filed: Apr. 12, 2012

(65) Prior Publication Data

US 2012/0312471 A1    Dec. 13, 2012

Related U.S. Application Data

(60) Provisional application No. 61/496,374, filed on Jun. 13, 2011.

(51) Int. Cl.
| | |
|---|---|
| *B65C 9/25* | (2006.01) |
| *C09J 5/00* | (2006.01) |
| *B29C 65/00* | (2006.01) |
| *B31B 1/60* | (2006.01) |
| *B32B 37/00* | (2006.01) |

(Continued)

(52) U.S. Cl.
CPC ............... *B29C 70/386* (2013.01); *B29C 65/10* (2013.01); *B29C 65/749* (2013.01); *B29C 66/4722* (2013.01); *B29C 35/02* (2013.01); *B29C 35/045* (2013.01); *B29C 66/721* (2013.01); *B29C 66/729* (2013.01); *B29C 66/81422* (2013.01); *B29C 66/81457* (2013.01); *B29C 66/8362* (2013.01); *B32B 37/0046* (2013.01); *B32B 38/0004* (2013.01); *B32B 38/1858* (2013.01); *B29C 63/0073* (2013.01); *B29C 65/02* (2013.01); *B29C 2793/0081* (2013.01)

(58) Field of Classification Search
CPC ........ B29C 53/00; B29C 53/02; B29C 53/04; B29C 53/043; B29C 53/08; B29C 53/083; B29C 53/16; B29C 53/20; B29C 53/36; B29C 53/56; B29C 53/564; B29C 53/80; B29C 53/8016; B29C 53/8091; B29C 53/84; B29C 53/845; B29C 65/00; B29C 65/02; B29C 65/48; B29C 66/001; B29C 66/00145
USPC .................................... 156/60, 285–286, 322
See application file for complete search history.

(56) References Cited

U.S. PATENT DOCUMENTS 2,156,134 A * 4/1939 Von Hofe ....................... 156/572
3,485,615 A * 12/1969 Carson et al. .................... 65/181
(Continued)

*Primary Examiner* — Richard Crispino
*Assistant Examiner* — Matthew Hoover
(74) *Attorney, Agent, or Firm* — Hovey Williams LLP

(57) ABSTRACT

An apparatus for laminating a fabric material to a part broadly comprises a cutting element, a heating system, a vertical pressure unit, and a compaction roller assembly. The cutting element may cut scrap material from the sides of the fabric material. The heating system may heat the fabric material after the material exits the vacuum conveyor assembly. The vertical pressure unit may apply a downward force on the compaction roller assembly, which may receive the fabric material and press the fabric material against a surface of the part. The compaction roller assembly may include a roller operable to have a variable curvature along its longitudinal axis and an actuating device operable to apply a variable torque to opposing ends of the roller to vary the curvature of the roller.

15 Claims, 10 Drawing Sheets

(51) Int. Cl.
- B29C 70/38 (2006.01)
- B32B 38/00 (2006.01)
- B29C 63/00 (2006.01)
- B29C 65/10 (2006.01)
- B29C 65/74 (2006.01)
- B29C 35/02 (2006.01)
- B29C 35/04 (2006.01)
- B32B 38/18 (2006.01)
- B29C 65/02 (2006.01)

(56) References Cited

U.S. PATENT DOCUMENTS

| | | | |
|---|---|---|---|
| 3,664,222 A * | 5/1972 | Early | 83/205 |
| 7,341,086 B2 | 3/2008 | Nelson et al. | |
| 7,611,601 B2 * | 11/2009 | Nelson et al. | 156/265 |
| 8,316,908 B2 * | 11/2012 | Ujiie et al. | 156/582 |
| 2010/0288437 A1 * | 11/2010 | Broad et al. | 156/285 |

* cited by examiner

MODULAR HEAD AUTOMATED FABRIC LAMINATING APPARATUS

RELATED APPLICATION

The present application is a regular utility patent application and claims priority benefit, with regard to all common subject matter, of earlier-filed U.S. provisional patent application titled "MODULAR HEAD AUTOMATED FABRIC LAMINATING APPARATUS", Ser. No. 61/496,374, filed Jun. 13, 2011. The identified earlier-filed application is hereby incorporated by reference in its entirety into the present application.

BACKGROUND OF THE INVENTION

1. Field of the Invention

Embodiments of the present invention relate to machinery for applying a fabric to a composite material part.

2. Description of the Related Art

Composite material parts, such as those used to construct aircraft components, may include a plurality of layers that are stacked and cured to form a monolithic composite structure. Often, the first layer and/or the last layer of the material is a woven fabric. During application, or lamination, of the woven fabric to the rest of the composite material, the woven fabric may bunch or wrinkle instead of adhering smoothly. As a result, the finished composite structure may have an inner surface and/or an outer surface with defects or nonuniformities. Furthermore, the lamination has traditionally been performed manually in a time-consuming and labor-intensive process.

SUMMARY OF THE INVENTION

Embodiments of the present invention solve the above-mentioned problems and provide a distinct advance in the art of composite manufacturing techniques. More particularly, embodiments of the invention provide an automated apparatus and methods for applying a fabric material to a composite material part.

Embodiments of the apparatus broadly comprise a supply spool, a heating system, a cutting element, a vertical pressure unit, and a compaction roller assembly. The supply spool may retain a fabric composite that includes the fabric material and a backing layer. As the fabric composite is unspooled from the supply spool, the backing layer may be separated from the fabric material and retained on a backing spool. The fabric material may travel downstream while the cutting element cuts scrap material from the sides of the fabric material. The scrap material may be retained on a scrap spool. The heating system may heat the fabric material after the material exits the vacuum conveyor assembly. The vertical pressure unit may apply a downward force on the compaction roller assembly, which may receive the fabric material and press the fabric material against a surface of the part. The compaction roller assembly may include a roller operable to have a variable curvature along its longitudinal axis and an actuating device operable to apply a variable torque to opposing ends of the roller to vary the curvature of the roller.

Other embodiments of the invention include a method of laminating a fabric material to a part comprising the steps of: supplying fabric material, applying a downward force to a roller, pressing the fabric material onto the part with the roller, and adjusting a curvature of the roller.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
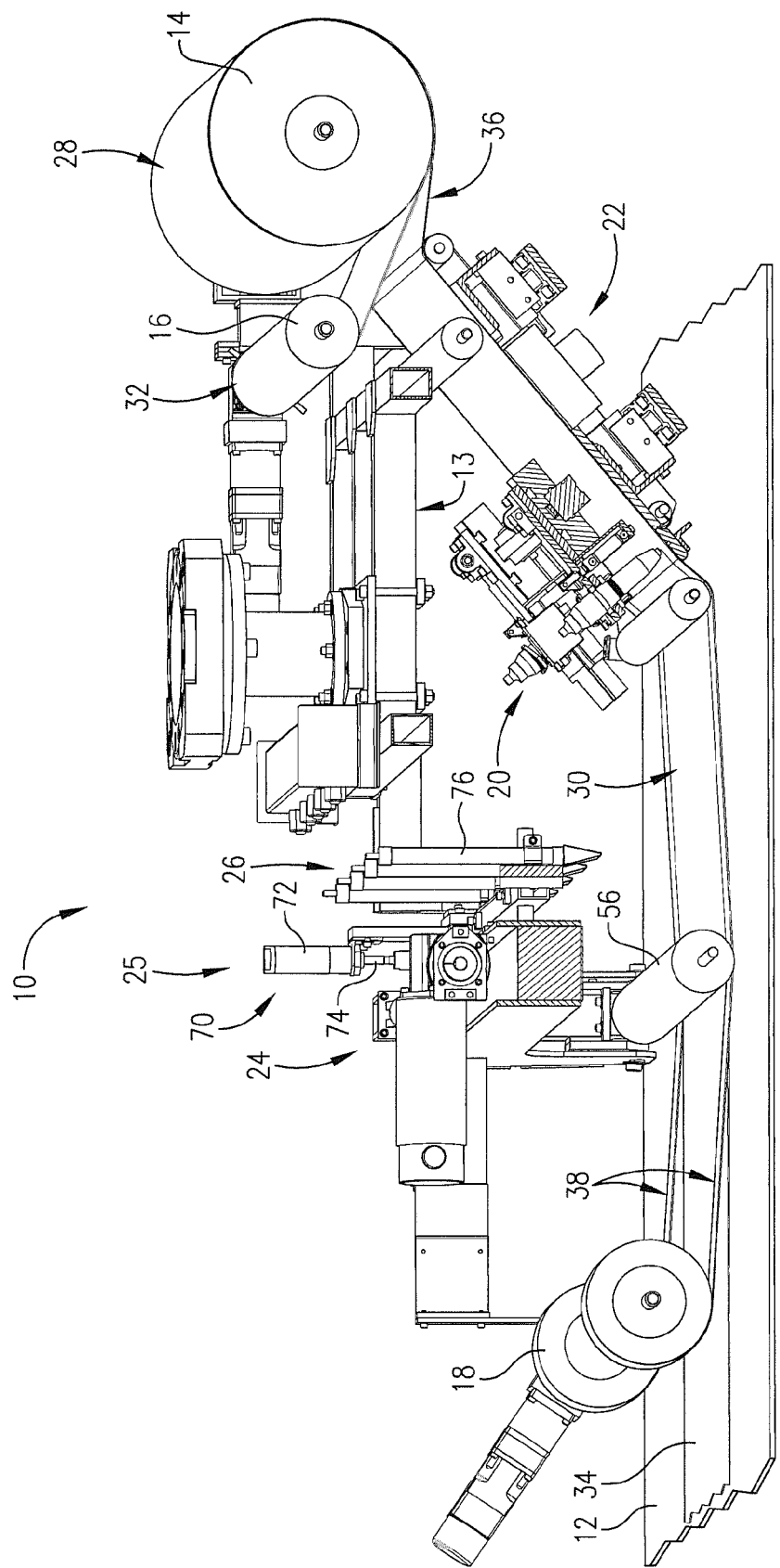
FIG. 1 is a side perspective view of an apparatus, constructed in accordance with various embodiments of the present invention, for laminating a fabric material to a part, in which portions of a cutting element, a vacuum conveyor assembly, and a compaction roller assembly have been removed.
Figure 2:
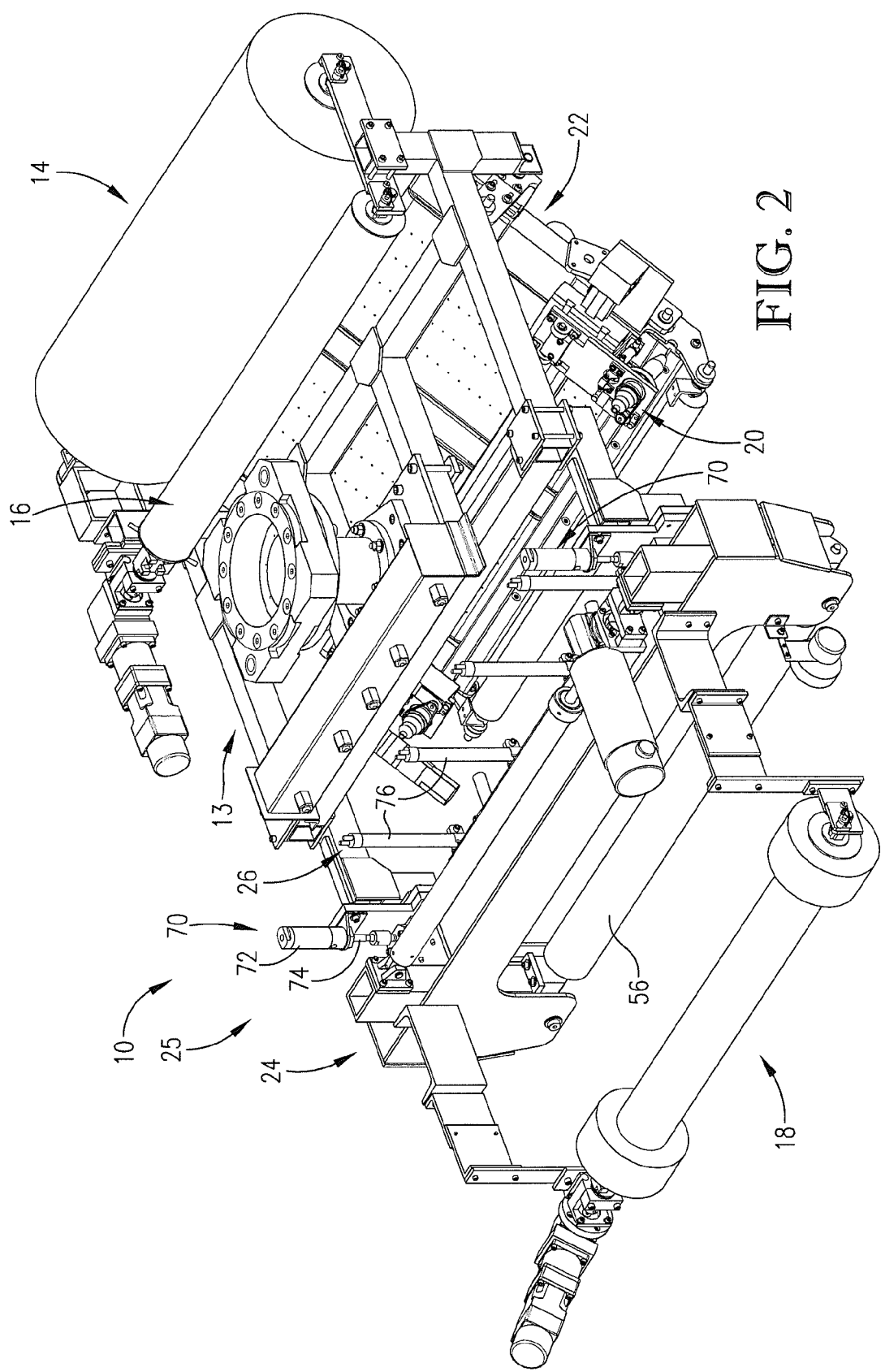
FIG. 2 is an upper perspective view of the apparatus.
Figure 3:
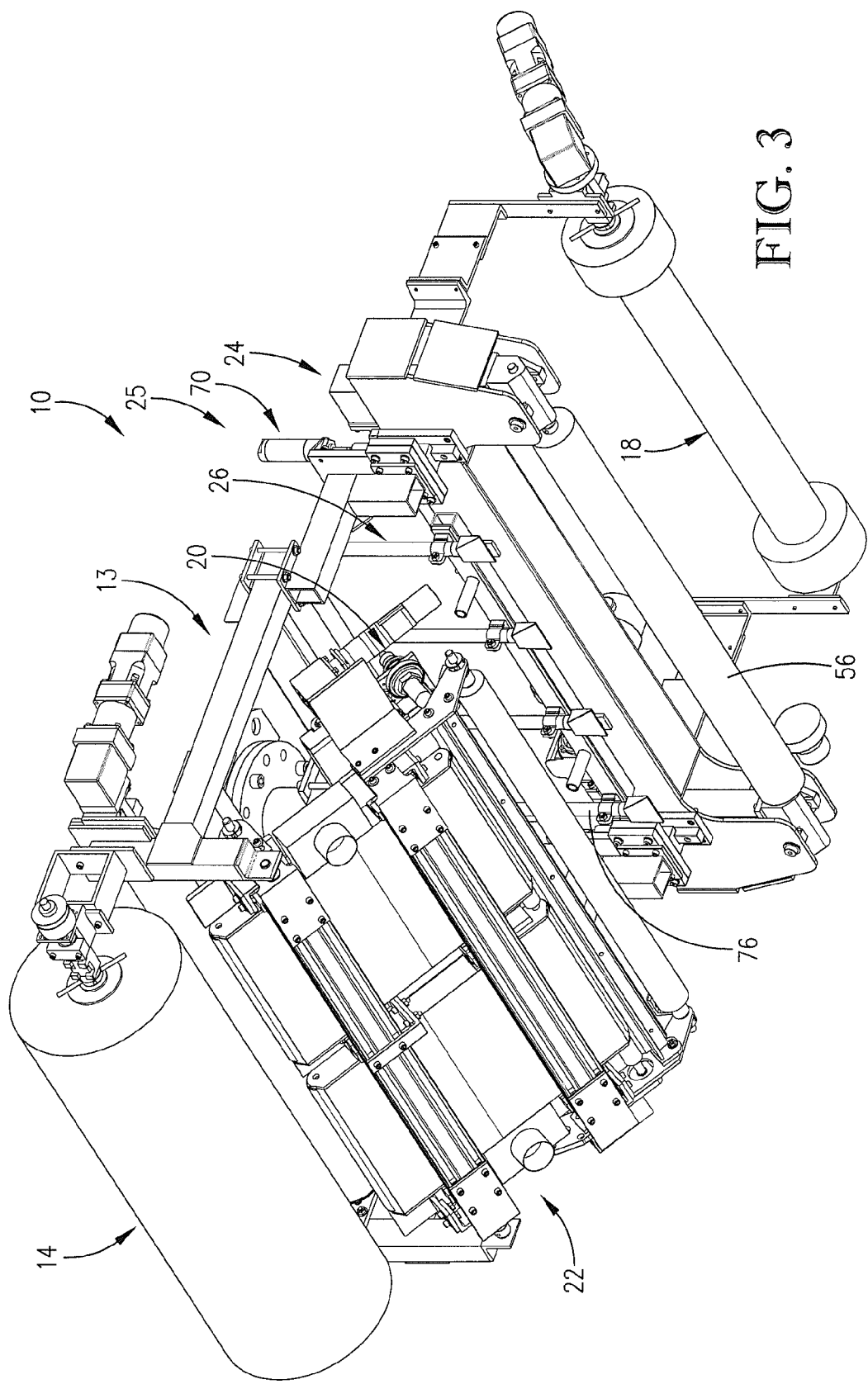
FIG. 3 is a lower perspective view of the apparatus.
Figure 4:
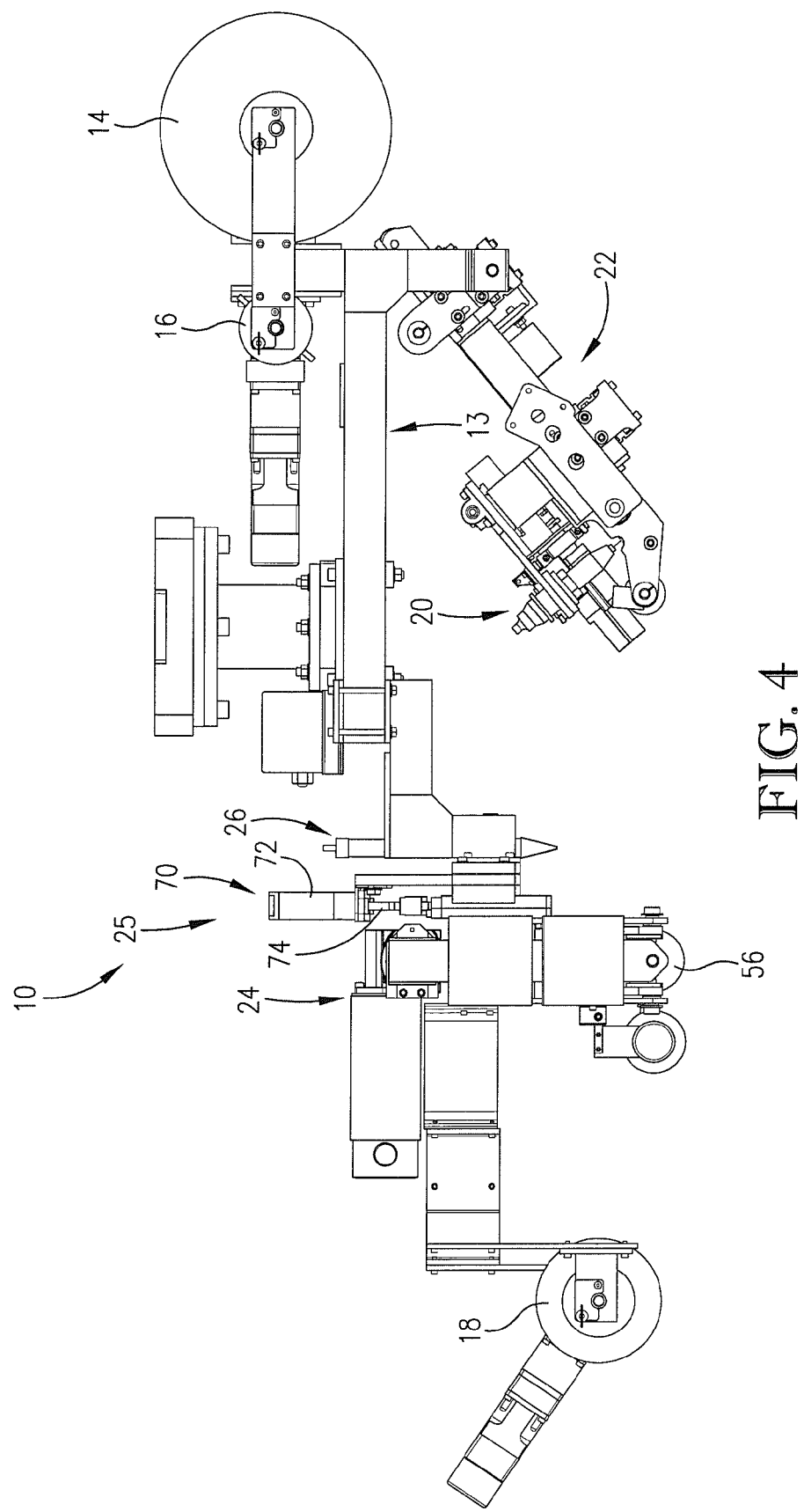
FIG. 4 is a left side view of the apparatus.
Figure 5:
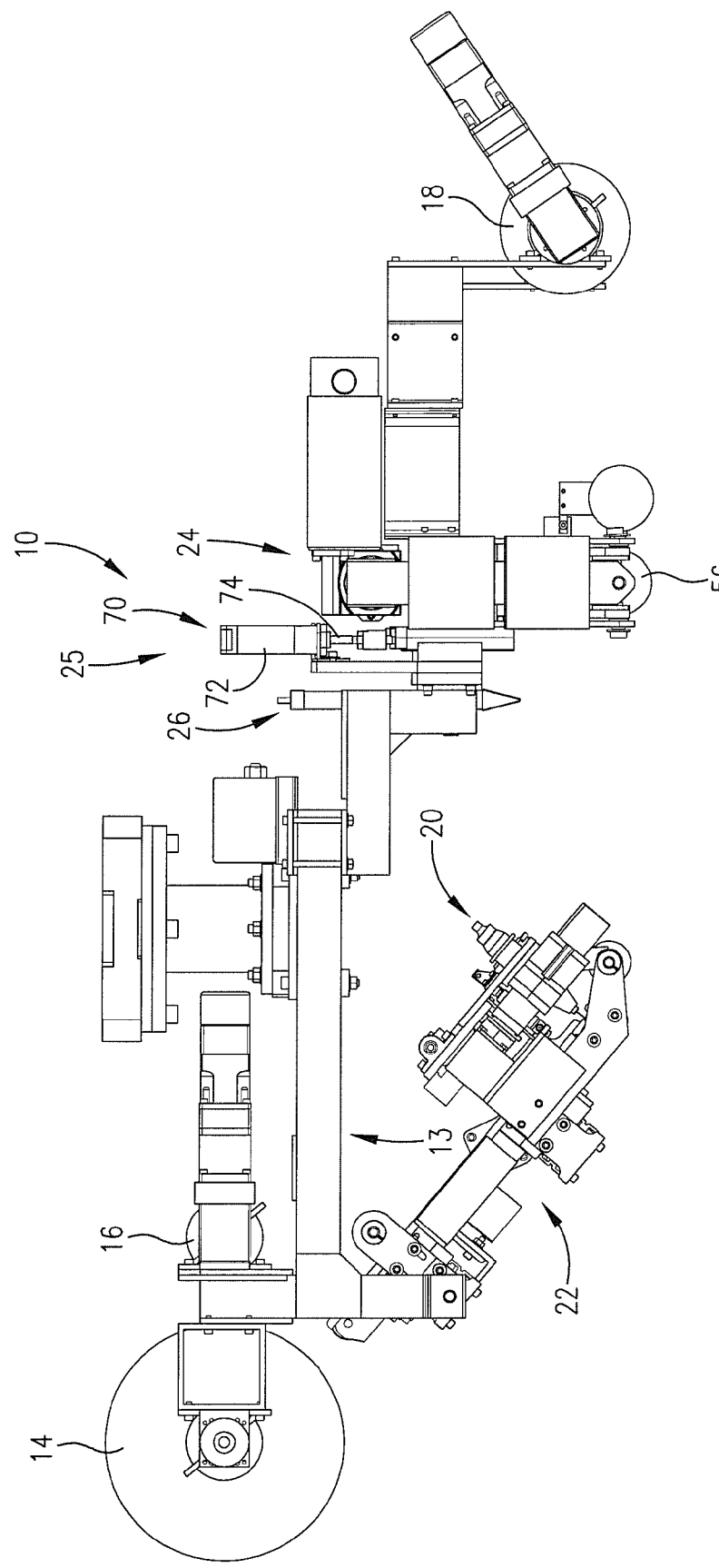
FIG. 5 is a right side view of the apparatus.
Figure 6:
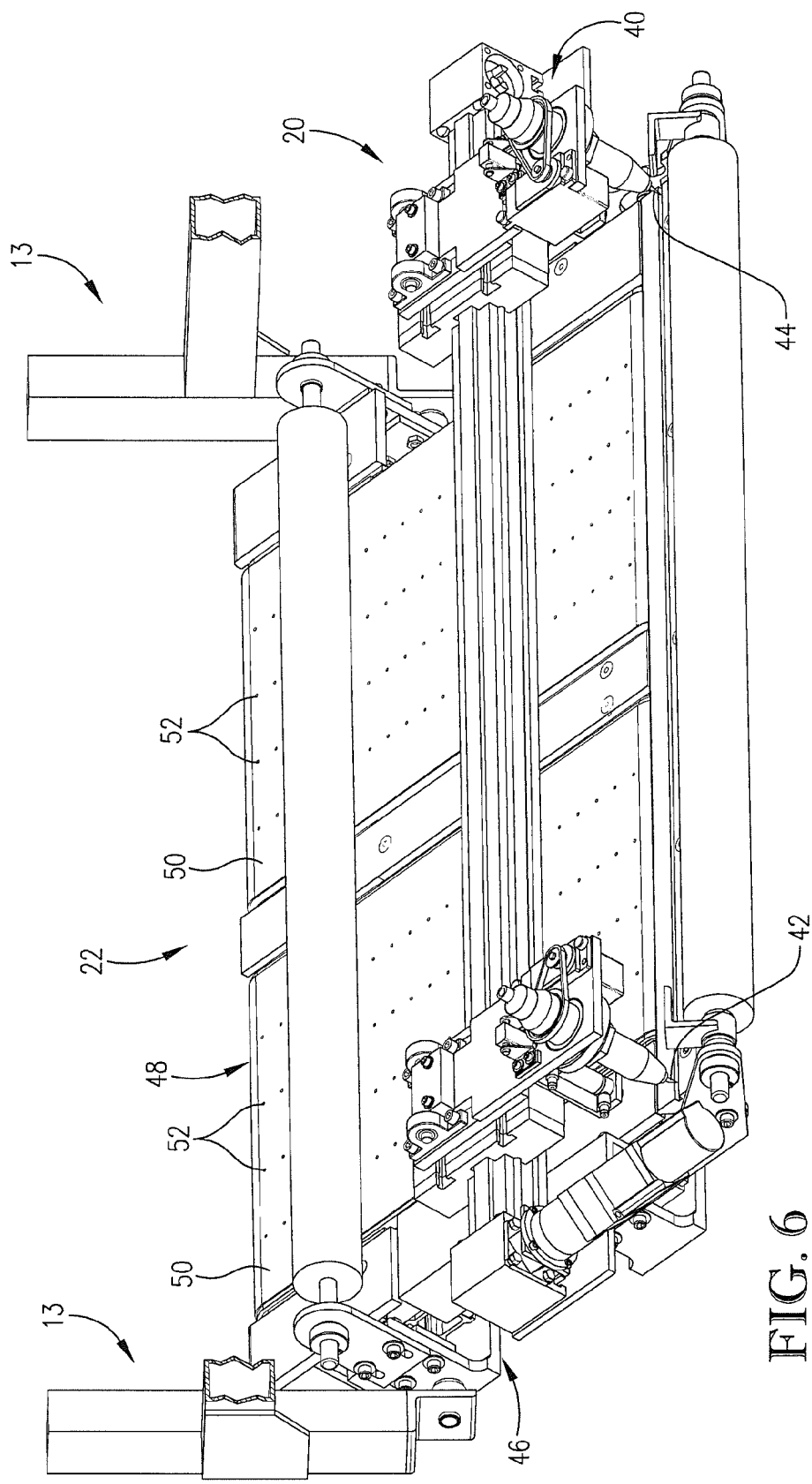
FIG. 6 is an upper perspective view of the vacuum conveyor assembly.
Figure 7:
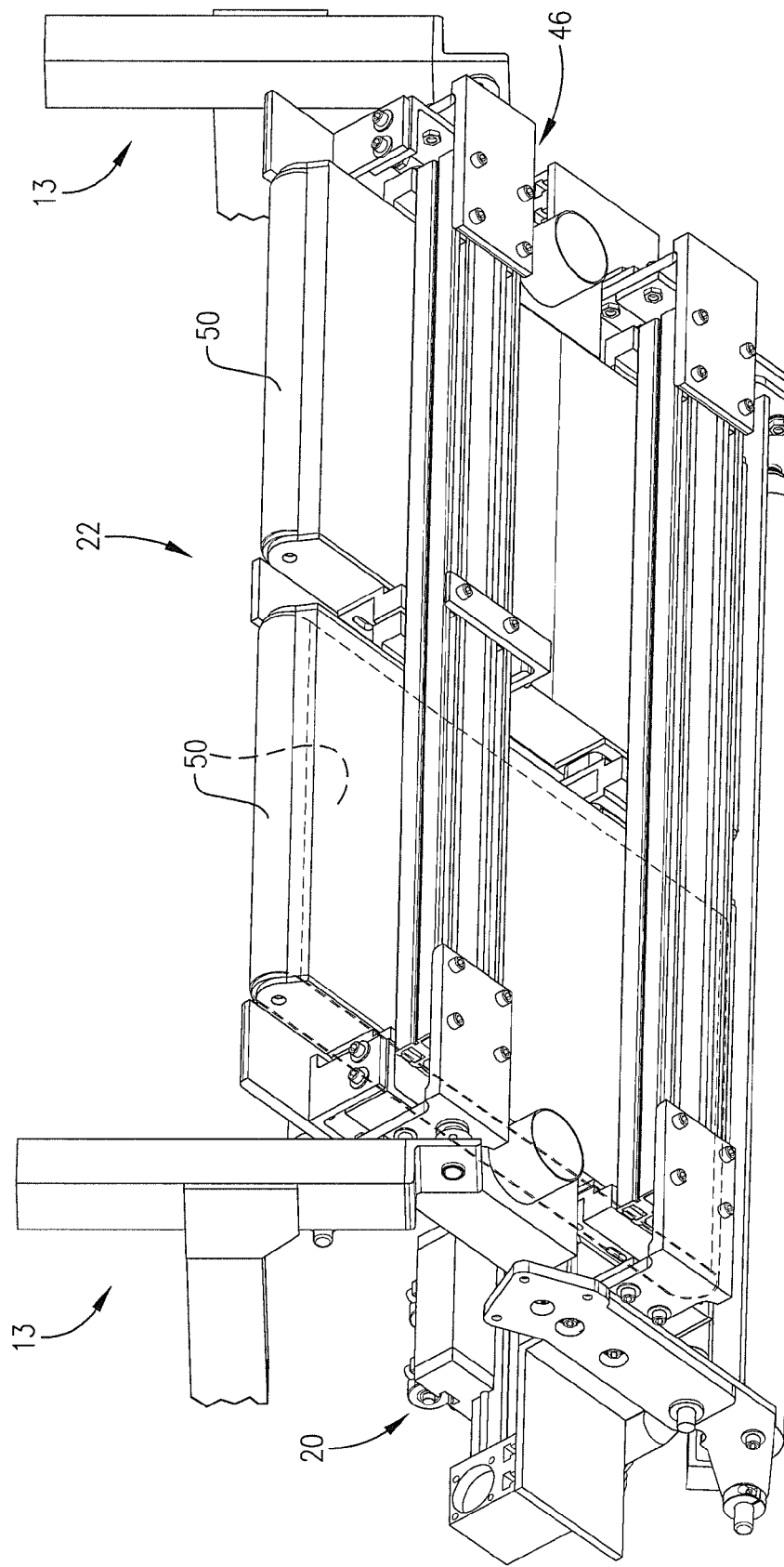
FIG. 7 is a lower perspective view of the vacuum conveyor assembly.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A modular head laminating apparatus 10 for applying a first layer or a last layer of material to a composite material part 12, constructed in accordance with various embodiments of the current invention, is shown in FIGS. 1-5. The apparatus 10 may broadly comprise a frame 13, a supply spool 14, a backing spool 16, a scrap spool 18, a cutting element 20, a vacuum conveyor assembly 22, a compaction roller assembly 24, a vertical pressure unit 25, and a heating system 26. The apparatus 10 may include additional components not shown in the figures or discussed in detail herein, such as motors or other drive mechanisms to move the components or rotate spools, controlling units to guide the operation of the apparatus 10, and the like.

The frame 13 generally holds the other components in a fixed position. The frame 13 may include rigid members, such as beams or bars, that couple to one another at right angles in a rectangular or square fashion. The frame 13 may further include members, components, connectors, and the like that couple the apparatus 10 to an external guide unit.

The supply spool 14, as seen in FIGS. 1-5, may be of elongated cylindrical shape and configured to retain a fabric composite 28 that has been rolled thereon. In certain embodiments, the supply spool 14 may be driven to rotate in either direction. The fabric composite 28, shown in FIG. 1, may be formed as an elongated sheet that includes a fabric material 30 and a backing layer 32. The fabric material 30 may include an upper surface 34 and a lower surface 36, wherein one or both surfaces may be tacky or may include an adhesive. An exemplary fabric material 30 may be inter-woven wire fabric. The backing layer 32 may be a non-stick film that is separably attached to the lower surface 36 of the fabric material 30.

The fabric material 30 is generally applied or laminated to at least one surface of a composite material part 12. As an example, the fabric material 30 may be laminated to the inner surface, the outer surface, or both surfaces of composite material that forms a composite part, such as an aircraft fuselage, aircraft wings, wind turbine blades, and the like. The dimensions of the supply spool 14 and the backing spool 16 may depend on the width of the fabric material 30, which may have an exemplary width of approximately 40 inches.

The term "downstream" may be used herein to describe the direction that the fabric material 30 flows as it moves from the supply spool 14 through the apparatus 10 and is applied to the composite material part 12.

The backing spool 16, as seen in FIGS. 1-5, may be of elongated cylindrical shape and configured to receive the backing layer 32 as the backing layer 32 is removed from the fabric material 30 before or during the lamination process. The backing spool 16 may be driven to rotate in the direction to take up the backing layer 32.

The scrap spool 18, as seen in FIGS. 1-5, may be of elongated cylindrical shape and configured to receive scrap material 38 as the fabric material 30 is cut to remove unwanted material before or during the lamination process. The fabric material 30 may be cut, usually along the sides, in order to make the fabric material 30 the correct width to fit on to the composite material. The scrap spool 18 may be coupled to the compaction roller assembly 24 and may be driven to rotate in the direction to take up the scrap material 38.

The cutting element 20, as seen in FIGS. 1-7, may include any common components, such as knives, blades, saws, or ultrasonic cutters, that are used for cutting material such as the fabric material 30. The cutting element 20 typically includes a pair of blades 40: a first blade 42 positioned near one side of the fabric material 30 and a second blade 44 positioned near the opposing side of the fabric material 30. The blades 40 generally cut the fabric material 30 along the sides to fit on to the composite material part 12.

The vacuum conveyor assembly 22, as seen in FIGS. 1-7, generally handles the fabric material 30 as the material 30 is unrolled and streamed from the supply spool 14. The vacuum conveyor assembly 22 may keep the fabric material 30 smooth, straight, and under tension as it is being trimmed by the cutting element 20. The vacuum conveyor assembly 22 may include a conveyor belt system 46 that forms a generally flat, rectangular upper surface 48 that receives the fabric material 30. The conveyor belt system 46 may include one or more belts 50 with a plurality of holes 52 or perforations distributed over the surface area of the belt 50. The vacuum conveyor assembly 22 may further include a suction source internal to the conveyor belt system 46 that provides vacuum to pull the fabric material 30 against the belt 50. During operation, the belt 50 rotates about end rollers in the direction of the flow of the fabric material 30 at a rate that corresponds to the rate of application of the fabric material 30 to the composite material part 12.

In various embodiments, the engagement of the vacuum conveyor assembly 22 is optional. In other words, the modular head laminating apparatus 10 may include the vacuum conveyor assembly 22 as described herein, but the vacuum conveyor assembly 22 may not be energized. The vacuum or suction may not be applied and the belts 50 may not be driven, although it is possible that the belts 50 may rotate passively. In such embodiments, tension is maintained on the fabric material 30 by the compaction roller assembly 24.

The compaction roller assembly 24, as seen in FIGS. 1-9, generally applies pressure to the fabric material 30 as it is being laminated onto the composite material part 12. An exemplary compaction roller assembly 24 may include a housing 54, a roller 56, and a roller adjustment system 58. The housing 54 may be elongated and rectangular in shape. At least one face of the housing 54 may be slidably coupled to the frame 13, such that the compaction roller assembly 24 may move in the vertical direction with respect to the frame 13. The roller 56 may be of elongated cylindrical shape with a soft elastomeric outer layer over a series of bearings mounted on a flexible central shaft. The roller 56 may be conformable along its length such that forces applied to the ends of the roller 56 may cause it to assume a curved or banana shape. The roller 56 is generally wider than the width of the fabric material 30. The roller adjustment system 58 applies a variable torque to the ends of the roller 56 to induce it to curve. The roller 56 may be curved in an outward, convex fashion or in an inward, concave fashion. Thus, the roller 56 may apply the fabric material 30 to a flat surface, an inward curved surface, or an outward curved surface.

Figure 8:
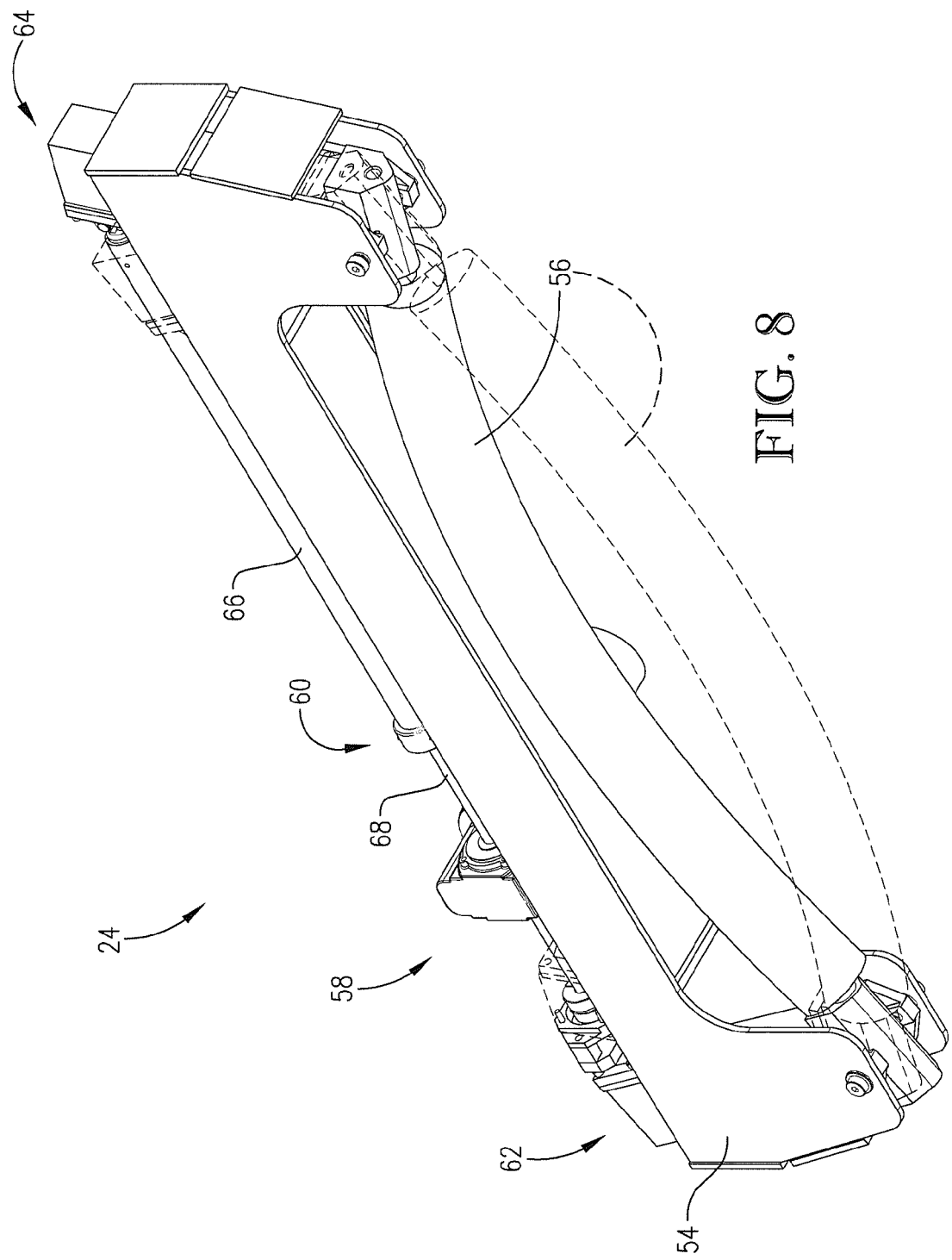
FIG. 8 is a lower perspective view of the compaction roller assembly.
Figure 9:
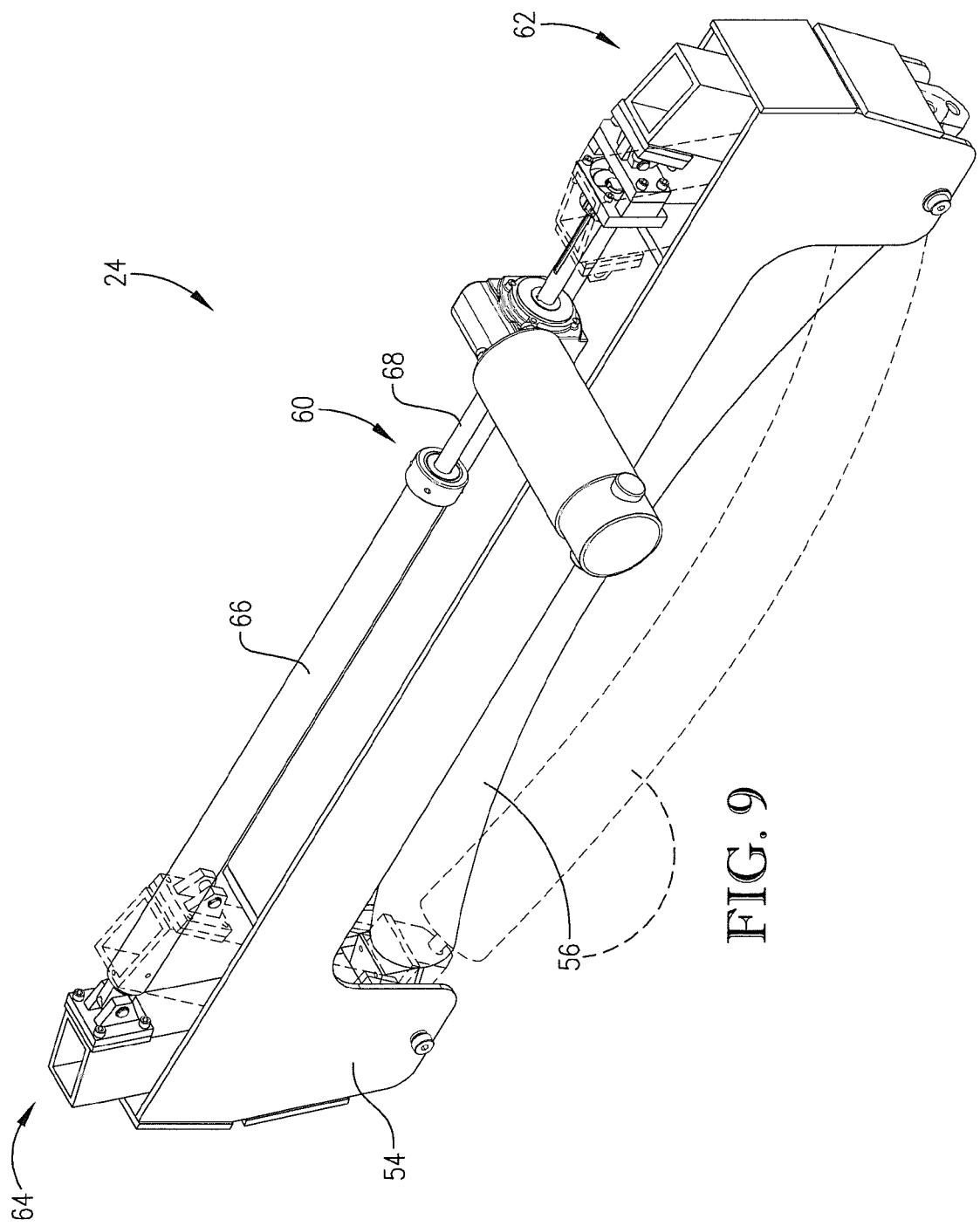
FIG. 9 is an upper perspective view of the compaction roller assembly.

The roller adjustment system 58, best seen in FIGS. 8-9, may include a roller adjustment actuating device 60, a first arm 62, and a second arm 64. The actuating device 60 may include a body 66 and a rod 68. The actuating device 60 may utilize electric motors, hydraulic or other fluid components, pneumatic or gas components, and the like, or combinations thereof. The rod 68 generally extends from and retracts into the body 66, and may include a default position, with respect to the body 66, at a middle distance of its length in order to orient the roller 56 at a neutral flat shape. An exemplary actuating device 60 includes a threaded rod 68 that is rotated to extend from and retract into the body 66. The actuating device 60 may be positioned between the first arm 62 and the second arm 64, with the rod 68 coupled to either the first arm 62 or the second arm 64 and the body 66 coupled to either the second arm 64 or the first arm 62. The first arm 62 and the second arm 64 are both rotatably coupled to the housing 54 of the compaction roller assembly 24.

When the rod 68 extends from the body 66 beyond its default position, the first arm 62 and the second arm 64 rotate in a first direction such that the roller 56 is forced from its neutral flat shape, shown in FIGS. 1-5, into a curved shape, as shown in FIGS. 8-9. The roller 56 generally curves inward, relative to the compaction roller assembly 24, as shown with normal lines in FIGS. 8-9. This configuration of the roller 56 may accommodate laminating the fabric material 30 onto an outward curved, or convex, surface. Furthermore, the amount of curvature of the roller 56 may be varied by the actuating device 60. Generally, the greater the elongation of the rod 68 from its default position, the greater the inward curvature of the roller 56.

When the rod 68 retracts into the body 66 from its default position, the first arm 62 and the second arm 64 rotate in a second direction, opposite to the first direction, such that the roller 56 is forced from its neutral flat shape into a curved shape. The roller 56 generally curves outward, relative to the compaction roller assembly 24, as shown with dotted lines in FIGS. 8-9. This configuration of the roller 56 may accommodate laminating the fabric material 30 onto an inward curved, or concave, surface. Furthermore, the amount of curvature of the roller 56 may be varied by the actuating device 60. Generally, the greater the retraction of the rod 68 from its default position, the greater the outward curvature of the roller 56.

The roller 56 may be operable to roll, or rotate about its central longitudinal axis, when it is in a neutral flat shape, a curved inward shape, or a curved outward shape.

In other embodiments of the roller adjustment system 58, the roller adjustment system 58 may be configured to curve the roller 56 outward when the rod 68 is extended from its default position and to curve the roller 56 inward when the rod 68 is retracted from its default position.

The vertical pressure unit 25 generally applies a downward force to the compaction roller assembly 24 and may include at least one vertical pressure actuating device 70. In exemplary embodiments, the vertical pressure unit 25 includes two vertical pressure actuating devices 70. The actuating device 70 generally includes actuators that can exert a linear force such as electric motor driven, hydraulic, or pneumatic actuators, or the like. An exemplary vertical actuating device 70 may be an air cylinder. The vertical pressure actuating device 70 may include a body 72 and an extensible rod 74. The body 72 may be coupled the frame 13, as seen in FIGS. 1-5, and the rod 74 may be coupled to the housing 54 of the compaction roller assembly 24. Thus, the housing 54 may receive downward pressure such that the compaction roller assembly 24 slides downward with respect to the frame 13. The downward pressure in turn forces the roller 56 downward against the surface of the composite material part 12.

The heating system 26, as seen in FIGS. 1-5, may include any devices or components capable of supplying thermal energy, such as coils or other resistive elements capable of carrying electric current, combustible gas burner or blower systems, or the like, or combinations thereof. The heating system 26 may include a plurality of heating elements 76 that are positioned in proximity to the compaction roller assembly 24. An exemplary heating system 26 may include four heating elements 76 spaced apart along the width of the fabric material 30 near the roller 56. The heating elements 76 may heat up the fabric material 30 just before it is pressed onto the composite material part 12 surface by the roller 56.

The modular head laminating apparatus 10 may be set up as follows. The fabric composite 28 may be loaded on to the supply spool 14. A portion of the fabric composite 28 may be unspooled from the supply spool 14 and the backing layer 32 may be separated from the fabric material 30. The backing layer 32 may be fed to and rolled on to the backing spool 16. The fabric material 30 may be fed to the vacuum conveyor assembly 22. In embodiments in which the vacuum conveyor assembly 22 is engaged, the suction source inside the conveyor belt system 46 may be activated. In most embodiments, the fabric material 30 may be aligned with the conveyor belt 50. The sides of the fabric material 30 may also be aligned with the blades 40 of the cutting element 20 so that the blades 40 are oriented to cut the sides of the fabric material 30 as the material 30 is forwarded on the conveyor belt 50. The fabric material 30 may then be directed to the compaction roller assembly 24 and may be aligned with the roller 56. The curvature of the roller 56 may also be set to match the curvature of the composite material part 12 surface. In addition, the scrap material 38, which is formed from the sides of the fabric material 30 cut by the blades 40, may be rolled on to the scrap spool 18.

The modular head laminating apparatus 10 may operate as follows and shown mainly in FIG. 1. In general, the apparatus 10 may be moved or guided by an external system in order to apply the fabric material 30 to the composite material part 12. Alternatively, the composite material part 12 may be moved or guided while the apparatus 10 applies the fabric material 30. The apparatus 10 may be positioned near the composite material part 12 such that the fabric material 30 is aligned and in contact with the surface of the part 12. The roller 56 may also be lowered to contact the fabric material 30 and apply pressure to the composite material part 12 surface.

As either the part 12 or the apparatus 10 is moved, the supply spool 14 unrolls, either from tension on the fabric composite 28 or from being driven, and supplies fabric material 30 to the vacuum conveyor assembly 22. While the fabric material 30 is fed to the vacuum conveyor assembly 22, the backing layer 32 may be separated from the fabric material 30 and rolled on to the backing spool 16. The fabric material 30 may travel forward to the cutting element 20, which cuts the edges of the fabric material 30 as it passes the blades 40. Downstream from the vacuum conveyor assembly 22 and before the fabric material 30 encounters the compaction roller assembly 24, the fabric material 30 may be heated by heating elements 76 of the heating system 26. The heated fabric material 30 may then be laminated onto the surface of the composite material part 12. The vertical pressure unit 25 may maintain a downward pressure on the compaction roller assembly 24. The roller 56 may apply a uniform force to the fabric material 30 to press it smoothly on to the part 12. And the roller 56 may rotate as either the apparatus 10 moves or the composite material part 12 moves. In addition, the curvature of the roller 56 may be adjusted as necessary while the fabric material 30 is being applied. The scrap spool 18 may be driven to receive the scrap material 38 as the fabric material 30 is laminated on to the composite material part 12.

Figure 10:
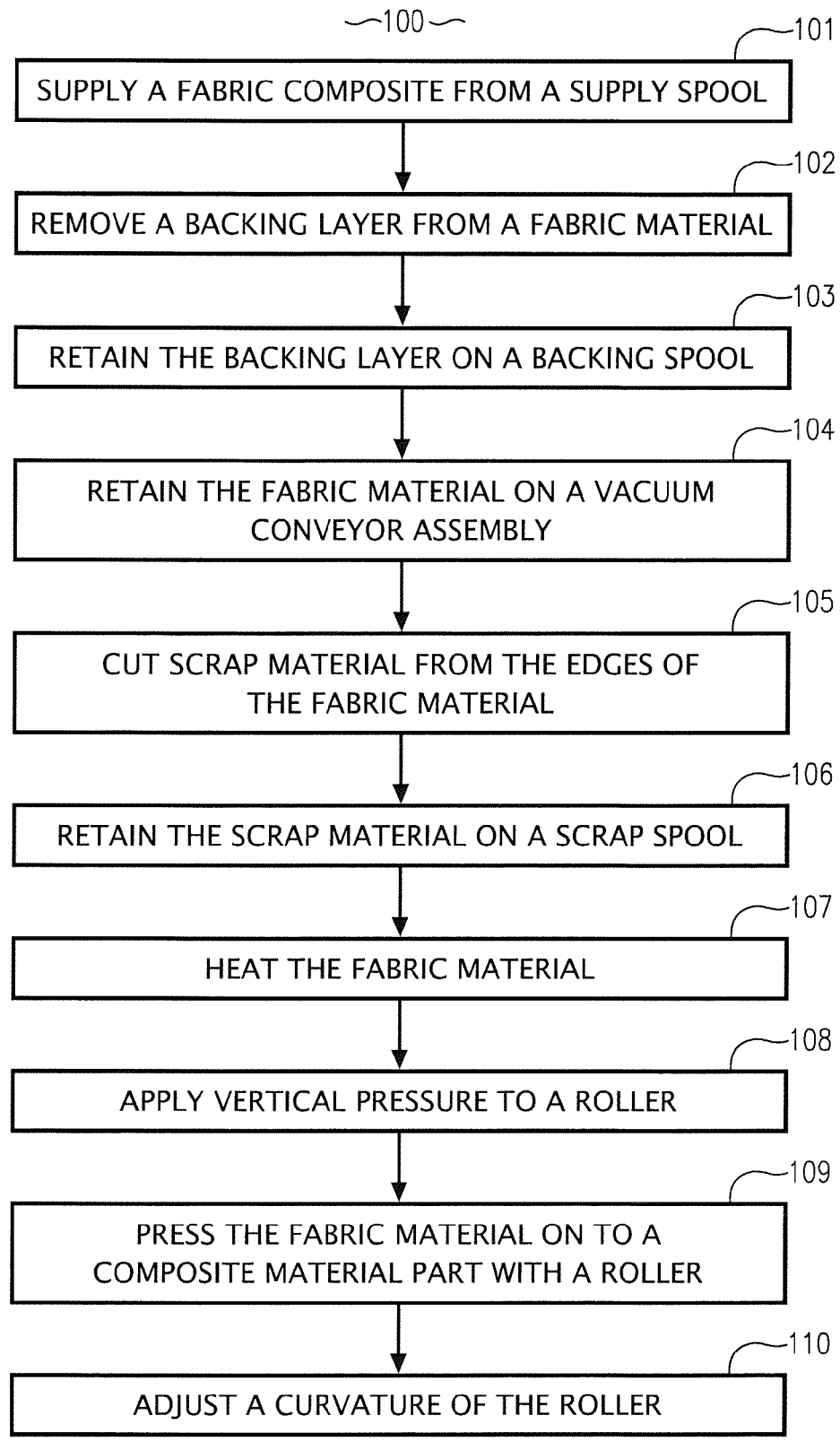
FIG. 10 is a flow diagram of steps of a method of laminating a fabric material to a composite material part.

Steps of a method 100 for laminating a fabric material 30 to a composite material part 12 in accordance with various embodiments of the present invention are illustrated in FIG. 10. The steps may be performed in the order shown in FIG. 10, or they may be performed in a different order. Furthermore, some steps may be performed concurrently as opposed to sequentially. In addition, some steps may be optional.

Referring to step 101, a fabric composite 28 is supplied from a supply spool 14. The fabric composite 28 may be formed as an elongated sheet and may be rolled onto the supply spool 14. The fabric composite 28 may include a fabric material 30 and a backing layer 32 in contact with a surface of the fabric material 30.

Referring to step 102, the backing layer 32 is removed from the fabric material 30. The separation of the backing layer 32 from the fabric material 30 may occur after the fabric composite 28 is unrolled from the supply spool 14.

Referring to step 103, the backing layer 32 is retained on a backing spool 16. The backing spool 16 may be rotated in order to receive the backing layer 32.

Referring to step 104, the fabric material 30 is optionally retained on a vacuum conveyor assembly 22 to maintain tension on the fabric material 30. The fabric material 30 may be received by the vacuum conveyor assembly 22 after the backing layer 32 is removed. A conveyor belt 50 may be part of the vacuum conveyor assembly 22 and may include a plurality of holes 52 distributed on the surface thereof. The vacuum conveyor assembly 22 may include an internal vacuum source which is optionally engaged and provides suction through the holes 52 and retains the fabric material 30 on the conveyor belt 50. The vacuum conveyor assembly 22 may include end rollers about which the conveyor belt 50 rotates and moves the fabric material 30 in a downstream direction.

Referring to step 105, scrap material 38 is cut from the edges of the fabric material 30. A cutting element 20 that includes a pair of spaced-apart blades 40 may be positioned in proximity to the vacuum conveyor assembly 22. As the fabric material is moved by the conveyor belt 50, the edges of the fabric material 30 may be cut by the blades 40. The cut-off edges of the fabric material 30 form the scrap material 38.

Referring to step 106, the scrap material 38 is retained on a scrap spool 18. The scrap spool 18 may be rotated to receive the scrap material 38.

Referring to step 107, the fabric material 30 is heated. A heating system 26 with a plurality of heating elements 76 may be positioned downstream from the vacuum conveyor assembly 22 and may heat the fabric material 30 after the fabric material 30 leaves the vacuum conveyor assembly 22.

Referring to step 108, vertical pressure is applied to a roller 56. The roller 56 may be part of a compaction roller assembly 24 to which a vertical pressure unit 25 is coupled. The vertical pressure unit 25 may include a vertical pressure actuating device 70 that applies a downward force to the compaction roller assembly 24 and in turn to the roller 56.

Referring to step 109, the fabric material 30 is pressed on to a composite material part 12 with the roller 56. The heated fabric material 30 may be applied to the surface of the composite material part 12 and be pressed downward by the roller 56. The roller 56 may rotate as either the apparatus 10 or the composite material part 12 is moved.

Referring to step 110, a curvature of the roller 56 is adjusted. The roller 56 may have a variable curvature along its longitudinal axis, such that the roller 56 may be flat, curved inward, or curved outward, with respect to the compaction roller assembly 24, to adapt to the curvature of the surface of the composite material part 12. The curvature of the roller 56 may be adjusted before and during the process of applying the fabric material 30 to the surface of the composite material part 12.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An apparatus for laminating a material to a part, the apparatus comprising:
   a cutting element that cuts a scrap material from edges of the material on a vacuum conveyor assembly during operation of the apparatus;
   a compaction roller assembly including a roller with an adjustable curvature along its longitudinal axis that is selectively adjusted to be straight, curve inward, or curve outward by applying a variable torque at opposing ends of the roller to cause it to bend with respect to the compaction roller assembly, the compaction roller assembly that receives the material from the vacuum conveyor assembly and that presses the material against a surface of the part during operation of the apparatus; and
   a vertical pressure unit that applies a downward force to the compaction roller assembly during operation of the apparatus.

2. The apparatus of claim 1, further including a heating system that heats the material after the material exits the vacuum conveyor assembly and before the material is received by the compaction roller assembly.

3. The apparatus of claim 1, further including:
   a frame,
   a supply spool coupled to the frame and that retains a composite that includes the material and a backing layer during operation of the apparatus,
   a backing spool coupled to the frame and that retains the backing layer during operation of the apparatus, and
   a scrap spool coupled to the compaction roller assembly and that receives the scrap material during operation of the apparatus.

4. The apparatus of claim 3, wherein the vertical pressure unit includes an actuating device with a body coupled to the frame and an extensible rod coupled to the compaction roller assembly that applies the downward force to the compaction roller assembly with respect to the frame during operation of the apparatus.

5. The apparatus of claim 1, further including a vacuum conveyor assembly that maintains the material under tension and that propels the material downstream, the vacuum conveyor assembly including a conveyor belt with a plurality of holes through which a suction is applied to retain the material during operation of the apparatus.

6. The apparatus of claim 1, wherein the compaction roller assembly further includes an actuating device that applies the variable torque to opposing ends of the roller to vary the curvature of the roller during operation of the apparatus.

7. The apparatus of claim 6, wherein the actuating device includes a body and a rod that extends from and retract into the body to apply the variable torque during operation of the apparatus.

8. An apparatus for laminating a fabric material to a part, the apparatus comprising:
   a cutting element that cuts a scrap material from the edges of the fabric material on a vacuum conveyor assembly during operation of the apparatus;
   a heating system that heats the fabric material after the material exits the vacuum conveyor assembly during operation of the apparatus;
   a compaction roller assembly that receives the fabric material from the vacuum conveyor assembly and that presses the fabric material against a surface of the part during operation of the apparatus, the compact roller assembly including
      a roller that has an adjustable curvature along its longitudinal axis that is selectively adjusted to be straight, curve inward, or curve outward during operation of the apparatus, and a roller adjustment actuating device that applies a variable torque to opposing ends of the roller to vary the curvature of the roller and to cause it to bend with respect to the compaction roller assembly during operation of the apparatus; and a vertical pressure unit that applies a downward force to the compaction roller assembly during operation of the apparatus.

9. The apparatus of claim 8, further including:

a frame, a supply spool coupled to the frame and that retains a composite that includes the material and a backing layer during operation of the apparatus, a backing spool coupled to the frame and that retains the backing layer during operation of the apparatus, and a scrap spool coupled to the compaction roller assembly and that receives the scrap material during operation of the apparatus.

10. The apparatus of claim 9, wherein the vertical pressure unit includes an actuating device with a body coupled to the frame and an extensible rod coupled to the compaction roller assembly that applies the downward force to the compaction roller assembly with respect to the frame during operation of the apparatus.

11. The apparatus of claim 8, wherein the actuating device includes a body and a rod that extends from and retract into the body to apply the variable torque during operation of the apparatus.

12. The apparatus of claim 8, further including a vacuum conveyor assembly that maintains the material under tension and that propels the material downstream, the vacuum conveyor assembly including a conveyor belt with a plurality of holes through which a suction is applied to retain the material during operation of the apparatus.

13. The apparatus of claim 1, wherein the variable torque is applied to each end of the roller causing each end to rotate about an axis transverse to the longitudinal axis of the roller.

14. The apparatus of claim 1, wherein the roller includes a soft elastomeric outer layer over a series of bearings mounted on a flexible central shaft.

15. An apparatus for laminating a fabric material to a part, the apparatus comprising:

a supply spool retaining a composite that includes the fabric material and a backing layer during operation of the apparatus;

a backing spool receiving the backing layer as the composite is unspooled from the supply spool during operation of the apparatus;

a vacuum conveyor assembly receiving the fabric material from the supply spool during operation of the apparatus, the vacuum conveyor assembly including a belt which conveys the fabric material;

a cutting element cutting scrap material from the edges of the fabric material during operation of the apparatus, the cutting element including a first blade and a second blade positioned on opposing sides of the belt;

a compaction roller assembly receiving the fabric material from the vacuum conveyor assembly and pressing the fabric material against a surface of the part during operation of the apparatus, the compact roller assembly including a roller having an adjustable curvature along its longitudinal axis that is selectively adjusted to be straight, curve inward, or curve outward, the roller including a soft elastomeric outer layer over a series of bearings mounted on a flexible central shaft, and a roller adjustment actuating device applying a variable torque to opposing ends of the roller to vary the curvature of the roller and to cause it to bend with respect to the compaction roller assembly during operation of the apparatus;

a heating system positioned between the vacuum conveyor assembly and the compaction roller assembly, the heating system heating the fabric material after the material exits the vacuum conveyor assembly and before the fabric material is pressed against the surface of the part; and a vertical pressure unit applying a downward force to the compaction roller assembly during operation of the apparatus.

* * * * *